United States Patent [19]

Takigawa et al.

[11] 4,262,722
[45] Apr. 21, 1981

[54] RADIAL TIRE FOR HEAVY LOAD VEHICLES

[75] Inventors: Hiroyoshi Takigawa, Kodaira; Nobuhiro Miyamura, Higashimurayama; Hiroshi Ogawa, Kodaira; Shinichiro Ohkuni, Tokyo, all of Japan

[73] Assignee: Bridgestone Tire Co., Ltd., Tokyo, Japan

[21] Appl. No.: 83,715

[22] Filed: Oct. 11, 1979

[30] Foreign Application Priority Data

Oct. 17, 1978 [JP] Japan .............................. 53-126853

[51] Int. Cl.³ ............................................. B60C 11/12
[52] U.S. Cl. ................................................. 152/209 R
[58] Field of Search ....... 156/209 R, 209 D, 209 NT, 156/209 WT; D12/152, 141

[56] References Cited

U.S. PATENT DOCUMENTS

| | | | |
|---|---|---|---|
| 3,176,748 | 4/1965 | Giebhart | 152/209 R |
| 3,482,616 | 12/1969 | French | 152/209 R |
| 3,559,712 | 2/1971 | Verdier | 152/209 R |
| 3,818,964 | 6/1974 | Maiocchi | 152/209 R |

*Primary Examiner*—Michael W. Ball
*Attorney, Agent, or Firm*—Sughrue, Rothwell, Mion, Zinn and Macpeak

[57] ABSTRACT

A radial tire for heavy load vehicles comprising a tread portion having an outer contour composed of a relatively transversely flat main region and a conical region located at both end edges of the main region. A number of thin incisions extend across the conical region having inner ends not reaching to the inside of the main region.

3 Claims, 2 Drawing Figures

RADIAL TIRE FOR HEAVY LOAD VEHICLES

BACKGROUND OF THE INVENTION

1. Field of the Invention

This invention relates to a radial tire for heavy load vehicles such as trucks, buses or the like, which is constructed to effectively suppress a wandering phenomenon of the tire.

2. Description of the Prior Art

In the specification, the wandering phenomenon shall be understood to mean a phenomenon experienced often by a driver of a heavy load vehicle such as a large type truck or the like when it runs in a wheel track formed when a highly used paved road surface becomes depressed or worn due to the vehicle weight, particularly when a driver tends to change the direction of the vehicle or to get away the vehicle from the wheel track in order to avoid an obstacle scattered thereon.

The radial tire for trucks and buses has a boundary between a tread and a sidewall provided with a sharp edged square shoulder has particularly been subjected to the wandering phenomenon. As a result, it has heretofore been proposed to use a round edged round shoulder tire for the purpose of alleviating the resistance to shocks subjected to the shoulder edge when the tire rides across the wheel track and hence of suppressing the wandering phenomenon.

Such a round shoulder configuration is affected by the bending of the tire produced by the dynamic load due to the amount of load or the vibration when the vehicle not only runs around the corner but also runs straight ahead. As a result, the round shoulder functions as a partial ground contact region. That is, this partial ground contact region is a rounded portion and hence is subjected to a ground contact pressure which is lower than that subjected to a relatively flat tread. The round shoulder therefore tends to easily respond to the local step or movement which is liable to be occur between the round shoulder and the ground surface in the ground contact region, thereby inducing an abnormal premature wear, that is, a shoulder wear.

SUMMARY OF THE INVENTION

An object of the invention, therefore, is to provide a radial tire which can effectively suppress the wandering phenomenon without inducing the shoulder wear.

A feature of the invention is the provision in a radial tire for heavy load vehicles constructed to effectively suppress the wandering phenomenon comprising a pair of annular bead bundles, a radial carcass toroidally extending across said bead bundles, and a tread portion including a reinforcing belt superimposed about said radial carcass. The tread portion has an outer contour composed of a relatively transversely flat main region exclusively adapted to make contact with ground when the tire normally runs and a conical region located at both end edges of the main region and inclined at a given angle with respect to a tangent drawn from the tread in parallel with the rotary axis of the tire. The improvement comprises a number of thin incisions extending across the conical region and circumferentially distant apart from each other, the inner end of the thin incision being located on at least the outer surface of the tread at a position which is not reached to the inside of said main region.

The term normal running shall be understood to mean substantially that rectilinear running condition of a vehicle which includes a change-over of the tracks one from the other on a good ground surface not provided with a plurality of wheel tracks, but excludes a riding over of the wheel tracks formed on a bad ground surface.

Further objects and features of the invention will be fully understood from the following detailed description with reference to the accompanying drawings, in which:

DETAILED DESCRIPTION OF THE PREFERRED EMBODIMENT

Figure 1:
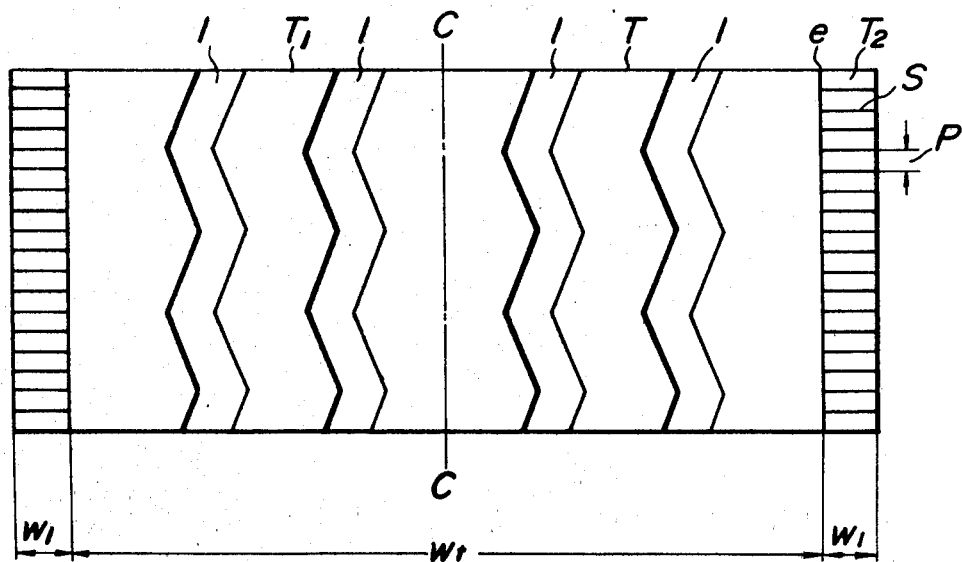
FIG. 1 is a partial development view of a tread of a radial tire according to the invention.
Figure 2:
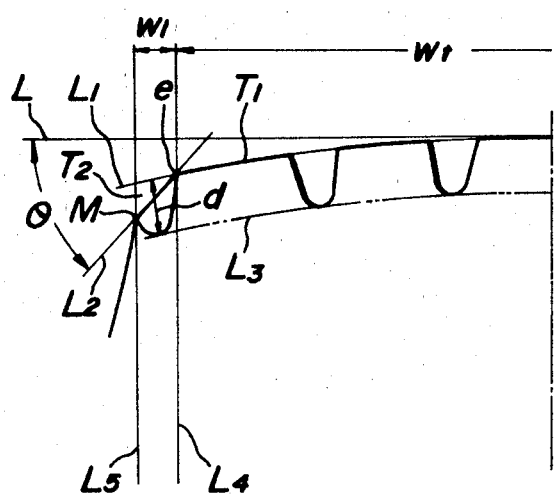
FIG. 2 is a cross-sectional view of a left half contour of the tread shown in FIG. 1.

FIG. 1 shows a development of a tread portion of a radial tire for heavy load vehicles according to the invention and FIG. 2 shows a contour of a left half cross-section of the tread portion shown in FIG. 1.

The radial tire for heavy load vehicles according to the invention comprises a pair of annular bead bundles, a radial carcass toroidally extending across these bead bundles and a tread portion superimposed about this radial carcass and including a reinforcing belt formed of inextensible material, all of these members being not shown.

It is a matter of course that the tread portion shown in FIG. 1 circumferentially extends along the tire periphery in an endless manner.

In the drawings, reference letter T designates a tread portion composed of a main region $T_1$ and a conical region $T_2$ formed at both ends of the main region $T_1$.

In the main region $T_1$ of the tread portion T are arranged two pairs of main grooves 1 symmetrically arranged with respect to the equatorial plane C-C of the tire.

The conical region $T_2$ formed at both ends of the main region $T_1$ of the tread portion T has a truncated conical surface defined by a line $L_2$ inclined at an angle $\theta$ of 30° to 60° with respect to a tangent L drawn from the tread T in parallel with the rotary axis of the tire.

That is, the conical surfaces $L_2$, $L_2$ make a vertical angle of 60° to 120° with respect to the rotary axis of the tire.

In the conical regions $T_2$ a number of thin incisions S are arranged circumferentially distant apart from each other by a given distance P.

The reasons why the angle $\theta$ is limited to the above mentioned range between 30° and 60° are as follows. If the angle $\theta$ is smaller than the lower limit of 30°, there is a risk of shoulder wear being induced in a range from the conical region $T_2$ to the main region $T_1$ in dependence with the condition of the tire in use. If the angle $\theta$ is larger than the upper limit of 60°, the conical region $T_2$ becomes difficult to match with ridges projected from the both sides of the wheel track, thereby reducing the effect of improving the wandering phenomenon.

The use of the conical region $T_2$ ensures a further improvement in the wandering phenomenon if compared with the conventional round shoulder tire and provides the important advantage that the abnormal wear of the conical region $T_2$ to be induced in the case of the tire rectilinear running can be prevented.

It is desirous to make a percentage ratio of a width $W_1$ of the conical region $T_2$ to a width $W_t$ of the main region $T_1$ a value which lies within a range between 2% and 7% for the purpose of effectively suppressing the wandering phenomenon and of maintaining the width $W_t$ necessary for bringing the tread into contact with ground when the tire runs normally.

Experimental tests have demonstrated the result that the use of the conical region $T_2$ only slightly induces the abnormal wear as in the case of the round shoulder tire in the case of cornering and that this abnormal wear can effectively be prevented by making the rigidity of the conical region $T_2$ small. For this purpose, provision may be made of a number of thin incisions S.

It is convenient to form such numerous thin incisions S in the conical region $T_2$ when the tire is shaped in a vulcanization mold. The use of an incision S having a gap which lies within a range between 0.3 mm and 1 mm ensures a convenient molding of the incision S without deteriorating its object.

A depth d of the thin incision S, a distance P between adjacent incisions S, in the circumferential direction of the tire and direction thereof are particularly important with respect to their influence upon the rigidity of the conical region $T_2$. In addition, the inner end position e of the incision S on the tread outer surface is also important with respect to its influence upon the uneven wear due to the incision S.

Inventors' experimental tests have demonstrated that the base of the incision S substantially reaches to an extrusion line $L_3$ passing through the bases of the main grooves 1 of the tread T and that the incision has a depth d which is preferably at most 1.3 times larger than the depth H of the main groove 1. This causes the thin incision S to maintain its effect even when the tread has completely been worn.

It is effective to arrange the thin incisions S in such a direction that they substantially extend across the conical region $T_2$ and are circumferentially distant apart from each other by a distance which is within a range between 1% and 5% of the width $W_t$ of the main region $T_1$ of the tread portion T. If the distance P is smaller than 1% of the width $W_t$ of the main region $T_1$, the manufacture of the tire becomes difficult and the rubber between the incisions becomes broken. If the distance P is larger than 5% of the width $W_t$ of the main region $T_1$, the effect of decreasing the rigidity of the conical region $T_2$ becomes in vain.

If the surface of the thin incisions as a whole is inclined at an angle which is larger than 45° with respect to the circumferential direction of the tire, the effect of decreasing the rigidity of the conical region $T_2$ could not be obtained and abnormal wear occurs at both edges e of the main region $T_1$. It is particularly important that the inner end of the thin incision S should not inwardly exceed both edges e on the tread outer surface of the main region $T_1$ and should not reach to the relatively flat surface of the main region $T_1$. If the thin incision S is arranged such that its inner end inwardly exceeds the above mentioned edge e, heel and toe wear is produced at a position near both edges of the main region $T_1$ of the tread portion T, thereby forming steps in front and rear of the thin incision S.

Further experimental tests have yielded the result that the inner end of the thin incision S should not inwardly exceed a perpendicular line $L_4$ drawn from the edge e of the main region $T_1$ toward the rotary axis of the tire on the outer surface of the tread portion T and substantially inside the rubber and that the outer end of the thin incision S should not outwardly exceed a perpendicular line $L_5$ drawn from the edge M of the conical region $T_2$ toward the rotary axis of the tire.

The depth H of the main groove 1 and the depth d of the thin incision S shall be understood to be measured on the outer surface of the tread portion T in a direction normal thereto.

A radial tire having a size of 10.00R20 14PR was manufactured for trial and its wandering ability and presence and absence of shoulder wear were tested. The tire was composed of a carcass including one radially arranged steel cord ply and a belt superimposed about the carcass and including four steel cord plies. The tread portion T is provided with four main grooves 1 each having a depth H of 14 mm.

The conical region $T_2$ has dimensions shown in the following Table.

| Conical region $T_2$ | Width ($W_1/W_2 \times 100$) | 5.3 |
|---|---|---|
| | Angle $\theta$ (°) | 45 |
| | Gap (mm) | 0.5 |
| | Distance ($P/W_t \times 100$) | 2.6 |
| Incision S | Depth (mm) | 17 mm |
| | Direction | 90° with respect to the circumferential direction of the tire |

The tire constructed as above described was mounted on a rim of 7.50 V and inflated under an internal pressure of 7.25 kg/cm². Then, the tire was mounted on a truck and the load was adjusted so as to make the wheel weight 2,425 kg. A running test of 100,000 km of this truck was carried out.

The wandering ability was tested during the above mentioned running test. An adverse torque exerted to the handle when the radial tire according to the invention runs in the wheel track and when the tire rides across the ridge of the wheel track and then is returned again into the wheel track and a frequency of the self-restoring torque subjected to the handle or the like were significantly improved if compared with those of the conventional radial tire not provided with the conical region $T_2$ including the thin incision S.

In addition, the use of the thin incision S in the conical region $T_2$ ensures substantially no occurrence of the shoulder wear during the 100,000 km running of the tire and hence results in a complete wear of the tire.

What is claimed is:

1. In a radial tire for heavy load vehicles constructed to effectively suppress wandering phenomenon having a pair of annular bead bundles, a radial carcass toroidally extending across said bead bundles, and a tread portion including a reinforcing belt superimposed about said radial carcass, said tread portion having an outer contour composed of a relatively transversely flat main region exclusively adapted to make contact with ground when the tire runs normally and a conical region located at both end edges of said main region and inclined at an given angle of 30°-60° with respect to a tangent drawn from the tread in parallel with the rotary axis of the tire, the improvement comprising; a number of thin incisions extending across said conical region and having inner ends each located on at least the outer surface of the tread at a portion not reaching the inside of said main region, said incisions being circumferentially spaced apart from each other by a distance which is within a range between 1% and 5% of the width of the main region of the tread portion, said conical region having a width measured in a direction parallel to the rotary axis of the tire and lying within a range between 2% and 7% of the width of said main region and said incisions having a gap within a range between 0.3 mm and 1 mm.

2. The radial tire according to claim 1, wherein said thin incision has a depth in the radial direction of the tire and measured on the extension line drawn from the base of the main groove of the tread which lies within a range between 1 and 1.3 times larger than the depth of the main groove.

3. The radial tire according the claim 1, wherein said thin incision is located between two vertical lines drawn from the inner and outer ends of said conical region toward the rotary axis of the tire.

* * * * *